US 8,362,918 B2

(12) United States Patent
Choi et al.

(10) Patent No.: US 8,362,918 B2
(45) Date of Patent: Jan. 29, 2013

(54) SYSTEM AND METHODS FOR MONITORING ENERGY CONSUMPTION AND REDUCING STANDBY POWER

(75) Inventors: Kwangsoon Choi, Goyang-si (KR); Youngchoong Park, Seoul (KR); Yangkeun Ahn, Seoul (KR); Kwangmo Jung, Seoul (KR); Woochool Park, Incheon (KR); Haemoon Seo, Yongin-si (KR); Kyeunghak Seo, Seoul (KR)

(73) Assignee: Korea Electronics Technology Institute, Seongnam (KR)

( * ) Notice: Subject to any disclaimer, the term of this patent is extended or adjusted under 35 U.S.C. 154(b) by 491 days.

(21) Appl. No.: 12/644,159

(22) Filed: Dec. 22, 2009

(65) Prior Publication Data
US 2010/0156666 A1   Jun. 24, 2010

(30) Foreign Application Priority Data

Dec. 24, 2008  (KR) .................. 10-2008-0133932

(51) Int. Cl.
*H04Q 9/00* (2006.01)
*H04B 7/00* (2006.01)
(52) U.S. Cl. ....... 340/870.07; 706/46; 706/61; 455/574; 455/343.1; 455/343.2; 455/343.4; 370/311; 370/318
(58) Field of Classification Search .................. 340/310, 340/870; 706/46, 61; 455/574, 343.1, 343.2, 455/343.4; 370/311, 318
See application file for complete search history.

(56) References Cited

U.S. PATENT DOCUMENTS

| | | | | |
|---|---|---|---|---|
| 7,447,526 | B2 * | 11/2008 | Kim et al. ..................... | 455/574 |
| 8,010,815 | B2 * | 8/2011 | Hamilton et al. ............. | 713/320 |
| 2008/0231121 | A1 | 9/2008 | Yang et al. | |

FOREIGN PATENT DOCUMENTS

| CA | CN-101702097 | * 11/2009 | ................... 340/870 |
|---|---|---|---|
| KR | 100633779 A | 1/2004 | |
| KR | 1020040009031 B1 | 2/2006 | |
| KR | 1020080026684 A | 9/2006 | |
| KR | 1020060115964 A | 11/2006 | |

OTHER PUBLICATIONS

International Search Report dated Oct. 9, 2009 issued by the International Searching Authority in International Application No. PCT/KR2009/005766.
Korean Patent Office Action issued in corresponding Korean Patent Application No. 10-2008-0133932 dated Oct. 20, 2010.
Korean Patent Office, Notice of Allowance issued in corresponding Korea Patent Appln. No. 10-2008-0133932 dated May 30, 2011.

* cited by examiner

*Primary Examiner* — Lam T Mai
(74) *Attorney, Agent, or Firm* — Sughrue Mion, PLLC

(57) ABSTRACT

A power saving system and method for the home appliances and home network devices is provided. The system provides an energy consumption monitoring and standby power saving system that is connected to home appliances and that may detect the amount of power consumed by corresponding home appliances. The system includes one or more energy saving nodes which approve application or shut-off power to a corresponding home appliances, and an energy saving server that is connected to each of the energy saving nodes and collects status information of the corresponding home appliances including said amount of power consumption from said nodes.

20 Claims, 3 Drawing Sheets

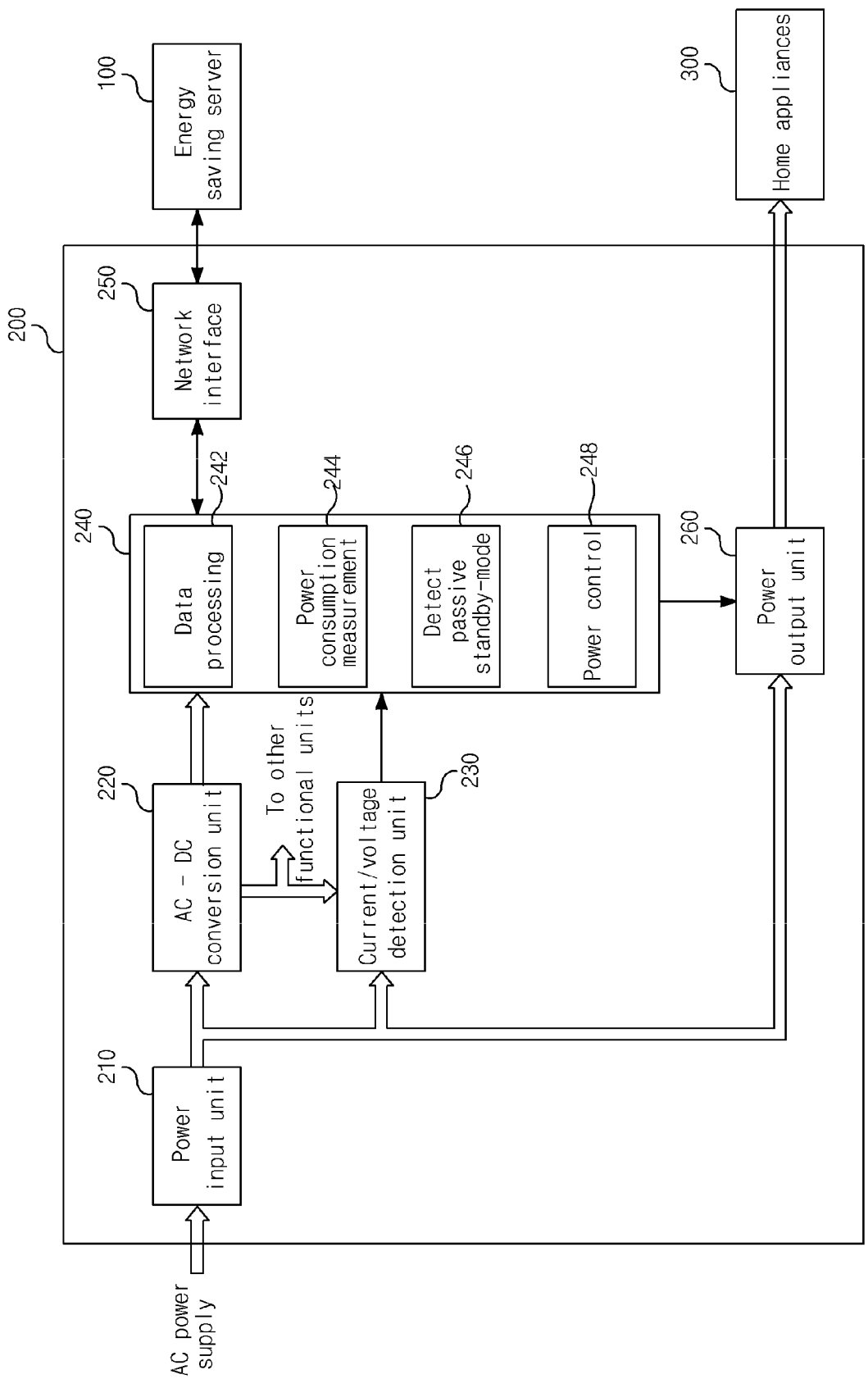

SYSTEM AND METHODS FOR MONITORING ENERGY CONSUMPTION AND REDUCING STANDBY POWER

CROSS-REFERENCE TO RELATED APPLICATIONS

This application claims the benefit under 35 U.S.C. §119 (a) of a Korean Patent Application No. 10-2008-0133932, filed with the Korean Intellectual Property Office on Dec. 24, 2008, the entire disclosure of which is incorporated herein by reference for all purpose.

BACKGROUND

1. Field

The following description relates to a system and method for monitoring energy consumption and reducing standby power, and more particularly, to a system and method that are capable of shutting off passive standby power and active standby power that is unnecessarily consumed by home appliances and home network devices.

2. Description of the Related Art

Due to the advancement of digital technology and network technology, home and information appliances are being developed to have various functions in trend with technological fusion and convergence. These home and information appliances may be spread widely throughout homes and offices. However, due to the fusion and convergence in functions and support for networking functions, these appliances not only consume communication standby power (or active standby power) without user's recognition, but also consume command queuing standby power (or passive standby power) without user's recognition. The power may be consumed through various ways such as waiting for a remote control input which is provided for user's convenience.

For example, in the case of a home, about 10 to 20% of total power consumption is consumed as standby power (passive and active). Due to the advance in home networking the weight of active standby power is increasing and such standby power is expected to increase to up to 20 to 40% of the total power consumption, of which about 70 to 80% is to be consumed by active standby power. Thus it is desirable to consume the active standby power in the future.

However, it is difficult for a user to determine when and how to consume electric power because it is difficult for the user to determine the amount of power consumed in a certain user's device for a specific period of time. Instead, the user only knows the total amount of power consumed, for example, based upon the monthly electric bill. Recently the demand of technology capable of assisting users to practice energy saving has been increasing.

To monitor the energy consumption for each appliance, only the digitalization of the meters, remote metering technology, and related equipments for measuring total amount of power consumed by the home and building units has been developed. However, the technology that is not capable of monitoring the power consumption for each appliance for a specific period of time.

For automatic shut-off of standby power, for example passive standby power, a user may shut the power off at a predetermined time using, for example, a remote control, an outlet, a timer, and the like. However, an outlet having an automatic shut-off function has not been developed yet. Furthermore, technologies and products which can automatically shut-off active standby power have not been developed yet.

For power service providers, only remote metering technology has been developed. However, technologies to feedback the collected power consumption data through an interworking system with higher level power suppliers and service providers has not been developed yet.

SUMMARY

In one general aspect, provided is a system for reducing standby power and monitoring electric energy consumed by home appliances and home network devices, the system comprising at least two energy saving nodes that are connected to home appliances, each energy saving node detects an amount of power consumed by a corresponding home appliance, and approves application or shut-off power to the corresponding home appliance, and an energy saving server that is connected to each of the energy saving nodes and that collects various status information of the corresponding home appliances including the amount of power consumption detected by the at least two energy saving nodes.

The energy saving nodes and the energy saving server may be connected through a Power Line Communication (PLC) or a Ubiquitous Sensor Network (USN).

The energy saving server may include a communication interface to communicate with a higher level system located in a power supplier who supplies power to a house or an office, or that is located in a power service provider who carries out power related services.

The energy saving server may be integrally implemented with a home gateway.

The energy saving server may include a home gateway interface for interworking with an external home gateway.

In another aspect, provided is an energy saving server for a system for reducing standby power and monitoring electric energy consumed by home appliances and home network devices that are connected to energy saving nodes that each detect the amount of power consumed by a corresponding home appliance and that approve application or shut-off power to the corresponding home appliance, the energy saving server comprising a functional module for collecting status information including the amount of power consumed by each corresponding home appliance, and a functional module for outputting a power control signal for each corresponding home appliance to the energy saving nodes, based on the status information.

The energy saving server may further comprise a functional module for transferring collected data to a higher level system located in a power supplier who supplies power to a house or an office, or that is located in a power service provider who carries out power related services.

The energy saving server may further comprise at least one of an RS-232 communication interface to provide consumed power monitoring or setting functions, an interface through IP network using PC and web browser, or a user interface through an application program provided by the energy saving server itself via a home network.

The energy saving server may further comprise an energy consumption monitoring functional module by which a user verifies energy consumption status through the user interface after calculation of consumed amount of the power for at least one of a specific time period, a specific appliance, a specific time period for a specific appliance, an accumulated amount of power used, and an estimated electricity cost data based on collected status information.

The energy saving server may further comprise a functional module supporting user settings through the user interface and performing an alarm based on the user settings.

The energy saving server may further comprise a functional module interworking current operation status of information appliances with a home gateway functional module or a home gateway.

The functional module that outputs the power control signal may output the power control signal to the energy saving nodes to shut-off standby power of a corresponding home appliance based on the status information.

When the standby power is a communication standby power, the functional module that outputs the power control signal may output the power control signal to the energy saving nodes to shut-off the standby power when it receives standby status of an appliance from the energy saving nodes to shut-off the standby power, prepare a stop command for the corresponding appliance to store context including at least one of a network setting and an equipment setting necessary when the corresponding appliance wakes up, into a built-in memory, and receive a report from the corresponding appliance that stop ready is completed.

In another aspect, provided is an energy saving node located between a power supply and a home appliance, the energy saving node comprising a detection means for detection of a voltage and a current supplied to a home appliance, a power output means to apply or shut-off power to a home appliance, a notification means to output status information including the amount of consumed power of an appliance in an audio-visual manner, and a centralized control means for calculating the status information including the amount of consumed power based on the voltage and current values inputted from the detection means and for controlling the power output means based on the status information.

In another aspect, provided is an energy saving node located between a power supply and a home appliance, the energy saving node comprising a detection means for detecting a voltage and a current supplied to a home appliance, a power output means to apply or shut-off power to a home appliance, a network interface means for communicating with a higher level network saving server, and a centralized control means for controlling the power output means, generating status information including the amount of consumed power based on the voltage and current values inputted from the detection means, and transferring the status information to a network saving server through the network interface means.

The power output means may include an always-on-state relay switch which becomes on-state when power is not supplied.

The detection means may include a MEMS based voltage and current sensors.

The centralized control means may control the operation of the power output means automatically or by a command of the energy saving server.

The network interface means may be based on at least one of a Power Line Communication (PLC), a ZigBee, and a Ubiquitous Sensor Network (USN).

The energy saving node may further comprise at least one of an outlet type which is an embedded or multi-tap type, an adaptor type that can be used by plugging into a conventional outlet, and a built-in type that can be installed inside of a home appliance.

Other features and aspects will be apparent from the following description, the drawings, and the claims.

BRIEF DESCRIPTION OF THE DRAWINGS

FIG. 3 is a diagram illustrating an energy saving node.

Figure 1:
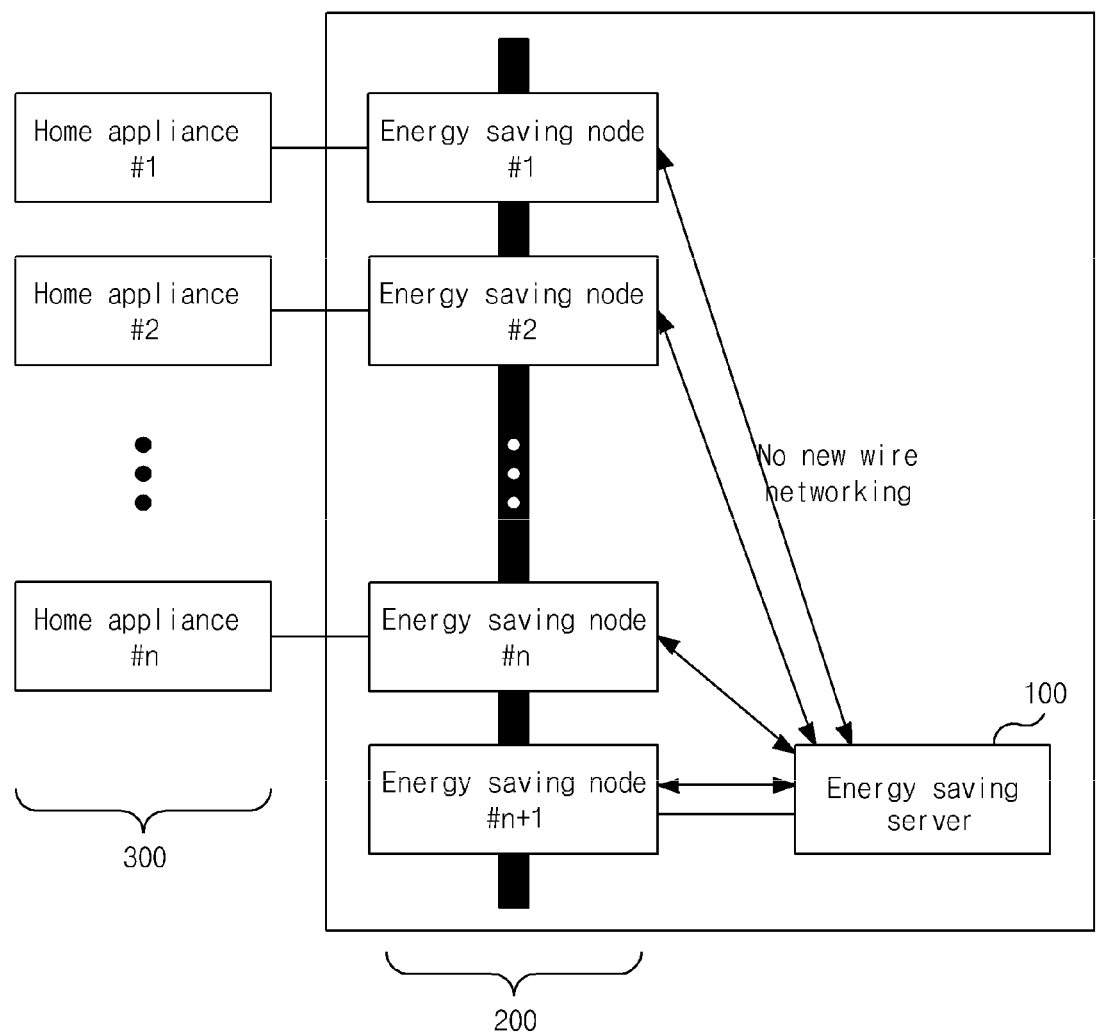
FIG. 1 is a diagram illustrating an example of a system for monitoring electric energy consumed by home appliances and home network devices, and for reducing standby power consumed by the appliances and devices.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 illustrates a system and method for monitoring electric energy consumed by home appliances and home network devices, and for reducing standby power consumed by the appliances and the devices.

Referring to FIG. 1, the system includes one or more energy saving nodes 200 and an energy saving server 100. For example, the system may include a plurality of nodes from node #1 to node #n.

In this example, the energy saving nodes 200 and the energy saving server 100 are connected using typical networking technology, for example, through a Power Line Communication (PLC), a ZigBee, a Ubiquitous Sensor Network (USN), and the like. The energy saving nodes 200 and the energy saving server 100 have structures enabling mutual transmission and reception of data and command. In this example, each energy saving node 200 is connected to a corresponding home appliance 300. Each energy saving node 200 applies or shuts off power to each corresponding home appliance 300.

Figure 2:
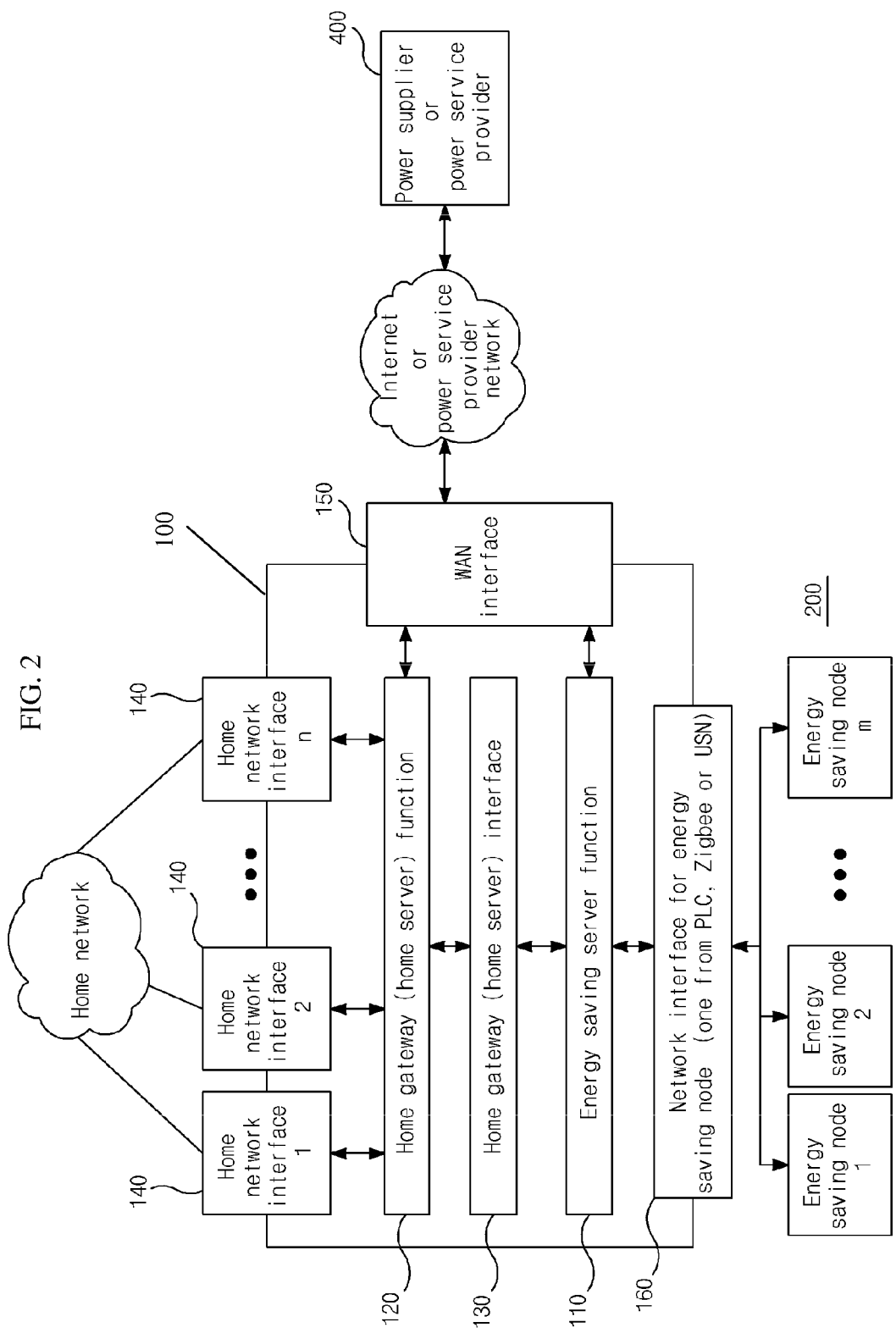
FIG. 2 is a diagram illustrating an example of an energy saving server and an overall system block diagram.

FIG. 2 illustrates an energy saving server and an overall system block diagram. An energy saving server 100 of the invention may have an interworking function 130 with a home gateway (home server) server 120 or a home gateway (home server) in addition to its unique function 110. The energy saving server 100 may be located in a home or an office, and may interwork with an existing home gateway or home server.

In some embodiments, the energy saving server 100 may perform the role of a gateway or a home server. In other words, a configuration wherein an energy management function is added to an existing home gateway or home server may be implemented. For example, the energy saving server 100 may communicate and interwork not only with the energy saving nodes 200 but also with appliances in the home and higher level system 400.

An energy saving server 100, as described above, may communicate with energy saving nodes 200 through network interface 160 that requires no new wiring. The energy saving server 100 may acquire data from the energy saving nodes 200. The data may include, for example, the amount of consumed power collected from the energy saving nodes 200 through communication with the energy saving nodes 200. The data may include status information such as operation time, and the like.

The energy saving server 100 may perform functions such as starting, completing, and initializing data by transferring commands to the energy saving nodes 200. The energy saving server 100 may perform functions such as initializing status information and transmission requests.

The energy saving server 100 may communicate with a higher level system 400 through a Wide Area Network (WAN) interface 150. The higher level system 400 may be, for example, a system located inside of a power supplier who supplies power to the outside of a home or an office, or a power service provider that provides power related services. Thus, the energy saving server 100 may communicate with a higher level system 400. The energy saving server 100 may transmit data collected based on the service objective and/or the desires of a power service provider.

An energy saving server 100 also has a user interface to provide monitoring results of consumed power and setting functions. For example, an RS-232 communication interface may be directly connected to the energy saving server 100. Also, an interface through IP network using PC and web browser may be connected to the energy saving server 100. The user interface may also be provided through an application program provided by the energy saving server itself via other home networks and so on.

The energy saving server 100 includes an energy consumption monitoring function by which a user may verify the consumed amount of electric power over a specific time period, for a specific appliance, and/or for a specific time period for a specific appliance. The energy saving server 100 may provide data such as accumulated amount of power used, or estimated electricity cost data through user interface.

An energy saving server 100 may provide a user setting and alarm functions. Thus, a user may set various user settings in the energy saving server 100 through user interface, and an alarm function may be provided in accordance with such settings. For example, by providing an alarm function to a user, if an instantaneous power consumption of a specific home appliance exceeds a specific value or estimated electric cost exceeds a specific value, an energy saving server 100 may assist the user by setting off an alarm.

The energy saving server 100 may provide an active standby power (communication standby power) shut-off function which enables an energy saving server to determine the current operation status of a home appliance 300, and it can figure out active standby power (communication standby power) consumption status in connection with a network.

For example, a home appliance may be prepared to stop communicating with a corresponding home appliance, and an active standby power (communication standby power) may be shut-off by shutting off the power supply. The power supply may be shut-off by commanding an energy saving node 200 that is connected to the corresponding home appliance 300.

When a home appliance 300 receives stop ready command, a home appliance 300 may store current context (various settings and status information etc.) in itself or in an energy saving server 100 in preparation for a power re-applying. Therefore, settings may be completed by re-reading stored setting values when power is re-applied.

The energy saving server 100 may be implemented by a home gateway (home server) integrated type, in other words, the energy saving server function may be added to an existing home gateway (home server) or on the contrary a home gateway (home server) function may be added to an energy saving server.

The home gateway (home server) interworking type may include a single type capable of interworking with a home gateway (home server) providing a pure energy saving server function excluding a home gateway (home server) function. For example, the energy saving server 100 may be a single type wherein only a pure energy saving server function is provided excluding home gateway (home server) function. Thus, the energy saving server 100 may not be capable of interworking with a home gateway (home server).

FIG. 3 illustrates an energy saving node shown in FIG. 1. Referring to FIG. 3, the example energy saving node 200 includes a power input unit 210 supplying power from AC power input, an AC-DC conversion unit 220 converting an AC power input from the power input unit 210 into a low voltage DC power, a current/voltage detection unit 230 detecting current and voltage consumed in a home appliance 300 connected to energy saving node 200, a centralized control unit 240 for performing various functions by controlling overall operations of the energy saving node 200, a network interface 250 for communicating with the external energy saving server 100, and a power output unit 260 to apply or shut-off power inputted through a power input unit 210 for an external home appliance 300.

The power input unit 210 may be comprised of a power connector, and a power output unit 260 may be comprised of a relay switch and may further include a driver unit to drive the same. For example, to supply the power for normal operation of a home appliance 300 even when the energy saving node 200 is operating abnormally or malfunctioned, an always-on-state switch such as a relay switch may be used. The relay switch becomes on-state when no power is applied.

The current/voltage detection unit 230 may adopt a current and voltage sensor implemented based on non-contact type Micro Electro Mechanical Systems (MEMS) to reduce self power consumption. A centralized control unit 240, which may be implemented by a MCU, performs various functions, for example, routine data processing 242, power consumption measurement 244, passive standby-mode detection 246, power control 248, and the like, through power output unit 260.

Each energy saving node 200 has an AC power supplying function to a home appliance 300 connected to the node.

An energy saving node 200 also has a shut-off function for an AC power which is transferred to a home appliance 300 automatically or by an external command from an energy saving server 100. The energy saving node 200 may perform an automatic passive standby power shut-off function which shuts off passive standby power by shutting off power automatically if a home appliance 300 connected to an energy saving node 200 is in a passive standby mode.

An energy saving node 200 also has a passive standby mode decision function for a home appliance whether a home appliance 300 connected to an energy saving node 200 is in a passive standby mode or in main operation mode by the detection value of a current/voltage detection unit 230, a power consumption measurement function which measures consuming power of a home appliance 300 connected to an energy saving node 200.

An energy saving node 200 may communicate with an energy saving server 100, through which a measured amount of consumed power may be transmitted to an energy saving server 100 by a command from the energy saving server 100.

The energy saving node 200 may be implemented by an outlet type comprising an embedded or multi-tap type wherein an energy saving node function is added to a conventional outlet. The energy saving node 200 may be implemented by an adaptor type that may be used by plugging into a conventional outlet wherein an energy saving node function which is pluggable into a conventional outlet is incorporated. The energy saving node 200 may be implemented by a built-in type that may be installed inside of a home appliance wherein an energy saving node function is incorporated into a modular component form.

Accordingly, provided herein is an energy consumption system and method for home appliances and home network devices that is capable of automatically shutting off not only passive standby power but also active standby power which is unnecessarily consumed in the residential environment including homes and offices. The system may provide real-time monitoring of the amount of consumed electrical energy of a specific appliance over a specific period of time and provide additional power related services through transmission of the collected data to power suppliers and service providers.

System and methods for reducing standby power and monitoring electric energy consumed by home appliances and home network devices of the present invention are not limited to the above described examples, and may be implemented through various modifications within the scope where the technical spirit of this invention permits. For example, in an energy saving system configuration comprising an energy saving node and an energy saving server, only an automatic passive standby power shut-off function may be provided only with an energy saving node without an energy saving server. Further, as described, when an energy saving system is comprised only with an energy saving node, a consumed power monitoring function can be additionally installed inside of the energy saving node so as to have an additional function (means) to inform a user of the monitored power consumption information in audio-visual manner, hence in this case, a consumed power monitoring is possible for only one home appliance.

The methods described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A system for reducing power and monitoring electric energy consumed by electrical devices, the system comprising:
   at least two energy saving nodes that are connected electrical devices, wherein each energy saving node detects an amount of power consumed by a corresponding electrical device, and approves application or shut-off of power to the corresponding electrical device; and
   an energy saving server that is connected to each of the energy saving nodes and that collects various status information of the electrical devices including an amount of power consumption detected by the energy saving nodes.

2. The system of claim 1, wherein the energy saving nodes and the energy saving server are connected through a Power Line Communication (PLC) or a Ubiquitous Sensor Network (USN).

3. The system of claim 2, wherein the energy saving server includes a communication interface to communicate with a higher level system located in a power supplier who supplies power to a network including the system, or that is located in a power service provider who carries out power related services.

4. The system of claim 3, wherein the energy saving server is integrally implemented with a gateway of a network.

5. The system of claim 3, wherein the energy saving server includes a gateway interface for interworking with an external gateway of a network.

6. An energy saving server for a system for reducing power and monitoring electric energy consumed by electrical devices, the energy saving server comprising:
   an interface connected to at least one energy saving node which detects an amount of power consumed by each of the electrical devices, and approves application or shut-off of power to each of the electrical devices;
   a functional module which collects status information including the amount of power consumed by each of the electrical devices, through the interface; and
   a functional module which outputs a power control signal to the energy saving nodes through the interface to control each of the electrical devices, based on the status information.

7. The energy saving server of claim 6, wherein the functional module that outputs the power control signal outputs the power control signal to the at least one energy saving node to shut off standby power of a corresponding electrical device based on the collected status information.

8. The energy saving server of claim 7, wherein, when the standby power is a communication standby power, the functional module that outputs the power control signal:
   outputs the power control signal to the at least one energy saving node to shut off the standby power when it receives standby status of the corresponding electrical device from the at least one energy saving node to shut off the standby power; and
   prepares a stop command for the corresponding electrical device to store context information including at least one of a network setting and an equipment setting necessary when the corresponding electrical device wakes up, into a memory of the electrical device or a memory of the energy saving server.

9. An energy saving server for a system for reducing power and monitoring electric energy consumed by electrical devices connected to at least one energy saving node which detects an amount of power consumed by each of the electrical devices and approves application or shut-off of power to each of the electrical devices, the energy saving server comprising:
- a functional module which collects status information including the amount of power consumed by each of the electrical devices;
- a functional module which outputs a power control signal to the energy saving node to control each of the electrical devices, based on the status information; and
- a functional module which transfers collected status information to a higher level system located in a power supplier who supplies power to the electrical devices, or located in a power service provider who carries out power related services.

10. The energy saving server of claim 9, further comprising at least one of a communication interface to provide consumed power monitoring or setting functions, an interface through an Internet protocol (IP) network, or a user interface through an application program provided by the energy saving server itself via a the network.

11. The energy saving server of claim 10, further comprising an energy consumption monitoring functional module by which a user verifies energy consumption status through the user interface after calculation of consumed amount of power for at least one of a specific time period, a specific appliance, a specific time period for a specific electrical device, an accumulated amount of power used, and an estimated electricity cost data based on the collected status information.

12. The energy saving server of claim 11, further comprising a functional module supporting user settings through the user interface and performing an alarm based on the user settings.

13. The energy saving server of claim 12, further comprising a functional module interworking current operation status of information devices with a gateway functional module or a gateway of the network.

14. An energy saving node located between a power supply and an electrical device, the energy saving node comprising:
- a detection means for detection of a voltage and/or a current supplied to the electrical device;
- a power output means to apply or shut off power the electrical device;
- a notification means to output status information including an amount of power consumed by the electrical device in an audio-visual manner; and
- control means for calculating the status information including the amount of power consumed by the electrical device based on the voltage and/or current values inputted from detected by the detection means, and controlling the power output means based on the status information.

15. An energy saving node located between a power supply and an electrical device, the energy saving node comprising:
- a detection means for detecting a voltage and/or current supplied to the electrical device;
- a power output means to apply or shut off power to the electrical device;
- a network interface means for communicating with a higher level energy saving server; and
- a control means for controlling the power output means, generating status information including an amount of power consumed by the electrical device based on the voltage and/or current detected by the detection means, and transferring the status information to a the energy saving server through the network interface means.

16. The energy saving of claim 15, wherein the power output means includes an always-on-state relay switch which becomes on-state when power is not supplied.

17. The energy saving node of claim 16, wherein the detection means includes a micro electro-mechanical system (MEMS) based voltage and/or current sensors.

18. The energy saving node of claim 17, wherein the control means controls operations of the power output means automatically or by a command of the energy saving server.

19. The energy saving node of claim 18, wherein the network interface means is based on at least one of a Power Line Communication (PLC), a ZigBee, and a Ubiquitous Sensor Network (USN).

20. The energy saving node of claim 18, further comprising at least one of an outlet type which is an embedded or multitap type, an adaptor type that can be used by plugging into an outlet, and a built-in type that can be installed inside of the electrical device.

* * * * *